United States Patent [19]

Shoup

[11] Patent Number: 4,486,644

[45] Date of Patent: Dec. 4, 1984

[54] METHOD FOR CONDUCTING SMUT-FREE WELDING

[75] Inventor: Thomas E. Shoup, Amherst, Ohio

[73] Assignee: TRW Inc., Cleveland, Ohio

[21] Appl. No.: 602,638

[22] Filed: Apr. 25, 1984

Related U.S. Application Data

[60] Continuation of Ser. No. 440,177, Nov. 8, 1982, , which is a continuation of Ser. No. 273,637, Jun. 15, 1981, , which is a division of Ser. No. 75,751, Sep. 14, 1979.

[51] Int. Cl.³ .............................................. B23K 9/20
[52] U.S. Cl. ......................................... 219/99; 239/8
[58] Field of Search ....................... 219/98, 99; 239/8; 228/18

[56] References Cited

U.S. PATENT DOCUMENTS

| | | | |
|---|---|---|---|
| 1,827,583 | 10/1931 | James | 239/8 |
| 2,007,029 | 7/1935 | Uhri, Jr. | 239/8 |
| 3,194,500 | 7/1965 | Byrd | 239/8 |
| 4,284,870 | 8/1981 | Ettinger | 219/99 |
| 4,306,137 | 12/1981 | Shoup et al. | 219/99 |

Primary Examiner—C. L. Albritton
Assistant Examiner—Alfred S. Keve
Attorney, Agent, or Firm—Allen D. Gutchess, Jr.

[57] ABSTRACT

A method for welding studs to a workpiece is provided. When studs are welded to workpieces using a drawn-arc, stud-welding technique, a coating of smut is sometimes deposited on the workpiece around the welded end of the stud. This coating detracts from the appearance and if the workpiece is covered with coating material, such as paint, the smut must first be removed, requiring an extra operation. It has been found that the coating of smut will not be deposited, if, during the welding cycle, fluid is carefully deposited on the weld area around the end of the stud where the weld occurs. This fluid consists of a small volume of low pressure air and an anti-smut liquid.

5 Claims, 5 Drawing Figures

METHOD FOR CONDUCTING SMUT-FREE WELDING

This is a continuation of application Ser. No. 440,177 filed Nov. 8, 1982, which is a continuation of application Ser. No 273,637 filed June 15, 1981, which is a division of application Ser. No. 075,751 filed Sept. 14, 1979.

This invention relates to a method for welding a stud to a workpiece without a coating of smut being deposited thereon, by supplying low pressure air and anti-smut fluid through a spark shield around the weld area.

The broad concept of supplying gas through a spark shield of ferrule around a stud to be welded to a workpiece is known in the art. This can be found in the following U.S. Pat. Nos. 2,727,123; 2,790,066; 3,096,429; 3,363,084; 3,736,401; 3,790,740. In these prior patents, the equipment employed was used to provide an inert atmosphere around an aluminum stud during welding, or to supply air around the stud to aid in welding through galvanized sheet steel. Pat. Nos. 3,495,066 and 3,676,640 also show welding equipment using gas around a welding area.

When studs are welded to workpieces by a drawn-arc, stud-welding technique, it is not uncommon for a coating of smut to be deposited on the workpiece around the welded end of the stud. This frequently occurs with trim studs which are welded to automobile bodies for the subsequent attachment of clips and trim strips or windshield mounting clips, for example. After the studs are welded and before the clips and trim are applied, the body receives a protective coating such as a primer, and subsequent decorative coatings. If the coating of smut around the welded stud is not first removed from the automobile body, the protective coating will not adhere properly and will separate from the surface. Thus, an extra operation is required to remove the smut after welding and before the first coating is applied.

In accordance with the invention, a method is provided for welding studs to workpieces without coatings of smut being deposited thereon. A spark shield is utilized around the stud and a chuck in which the stud is held, with the spark shield having a plurality of passages therein which are directed toward the workpiece around the location where the stud is to be welded. Fluid is then directed through the passages toward the area during the welding cycle. The fluid consists of low pressure air and an anti-smut liquid which is gently deposited on the surface of the weld area at low velocity, in thin films. The fluid does not impinge directly on the weld area in line with the end of the stud; otherwise, the pilot arc and the subsequent welding arc imposed between the end of the stud and the workpiece may be blown out or extinguished so that a weld would not result. The end of the spark shield also has a plurality of notches therein through which gases and small beads of weld metal, known as splatter, can escape. The notches also help to direct the fluid.

It is, therefore, a principal object of the invention to weld studs to workpieces without coatings of smut being deposited on the workpieces around the studs.

Another object of the invention is to provide an inexpensive method for welding studs to workpieces and to prevent coatings of smut from being deposited on the work-pieces during the welding cycle.

A further object of the invention is to weld trim studs to automobile bodies and to subsequently coat the bodies with protective material without first having to remove coatings of smut around the studs.

Yet another object of the invention is to provide a method for preventing coatings of smut from being deposited around welded studs by directing low volume air and anti-smut liquid onto the area around the stud during the welding cycle.

Many other objects and advantages of the invention will be apparent from the following detailed description of a preferred embodiment thereof, reference being made to the accompanying drawings, in which.

Figure 1:
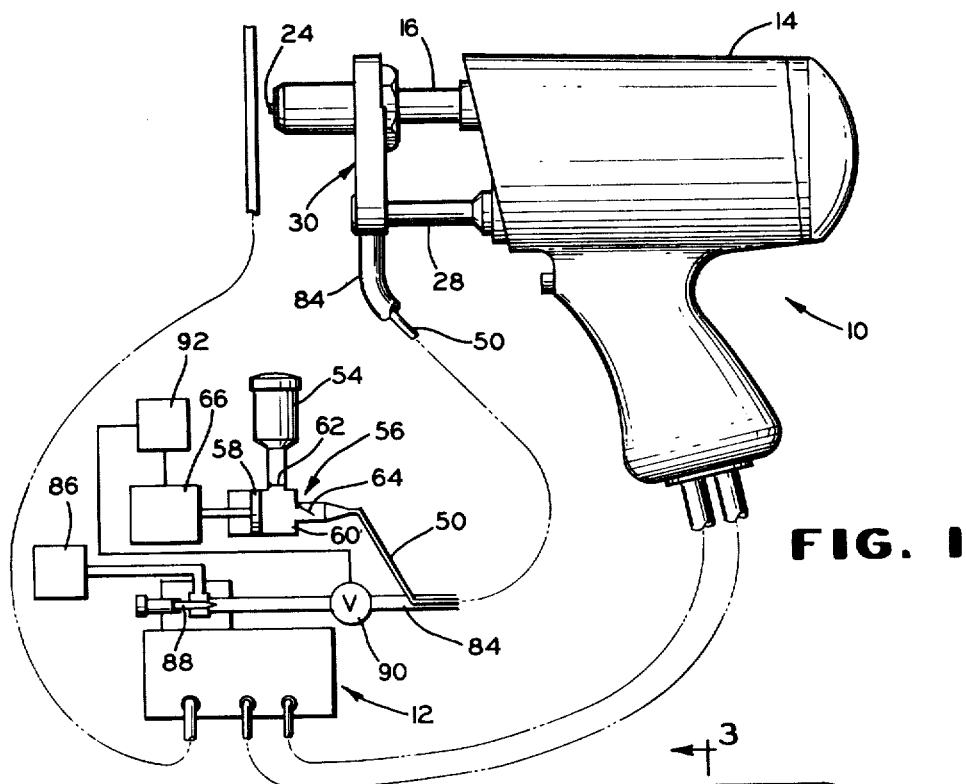
FIG. 1 is an overall schematic view, partly in elevation and partly in section, of apparatus for welding studs to workpieces in accordance with the invention.

Referring to the drawings, and particularly to FIG. 1, a stud welding tool 10 according to the invention is used to weld a stud to a workpiece by means of a drawn-arc welding technique. The basic tool is known in the art and includes means for retracting a stud from the workpiece, means for holding the stud in the retracted position for a predetermined period of time, and means for moving or plunging the stud toward and against the workpiece at the end of the predetermined period. As the stud is retracted from the workpiece, a pilot arc is drawn between the end of the stud and a main welding arc is subsequently imposed on the pilot arc, with the main welding arc then being maintained until the stud is plunged back against the workpiece. The tool can be of the type shown in U.S. Pat. No. 3,525,846, for example. This tool preferably utilizes a capacitor discharge type of power source, as shown in U.S. Pat. No. 3,136,880, for example.

Figure 2:
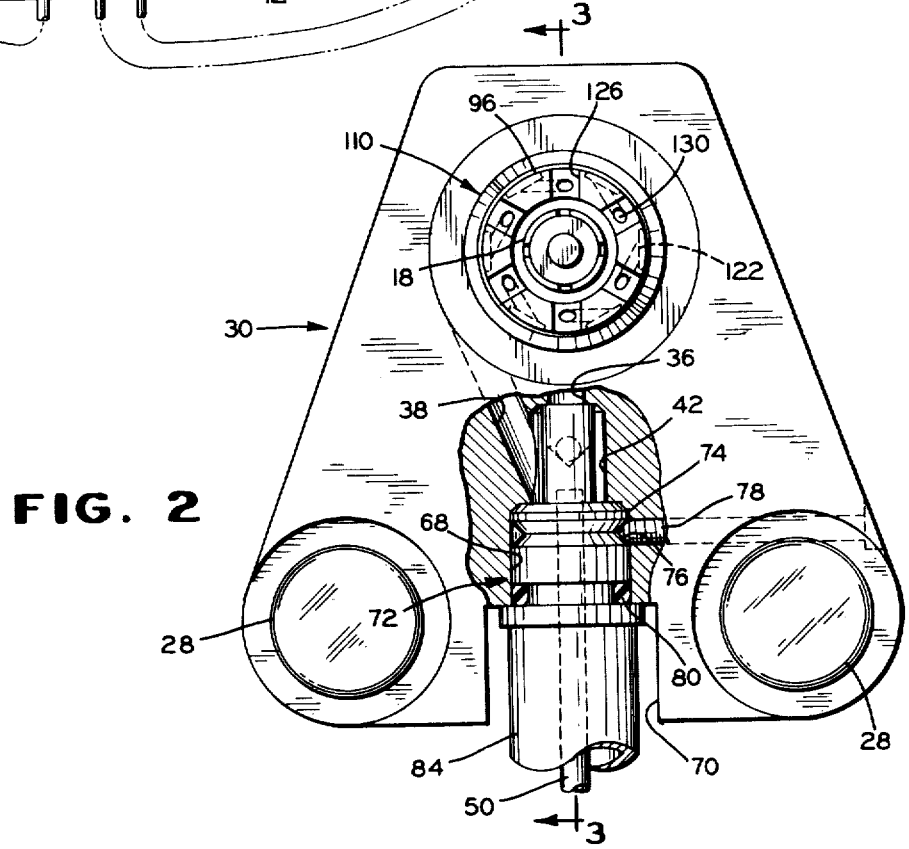
FIG. 2 is an enlarged, front in elevation, with parts broken away and with parts in cross section, of a welding foot and spark shield of the apparatus of FIG. 1.
Figure 4:
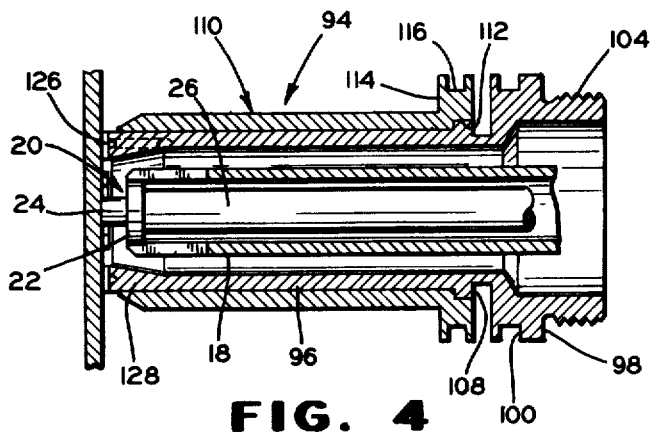
FIG. 4 is a view in longitudinal cross section of the spark shield and a chuck.
Figure 5:
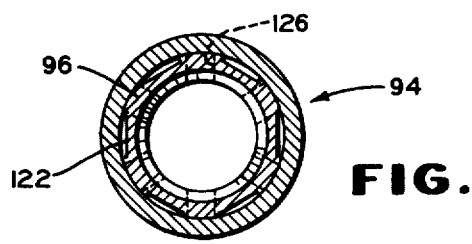
FIG. 5 is a view in transverse cross section taken generally along the line 5—5 of FIG. 3.

A power and control unit 12 supplies power for the pilot and the main welding arcs and for a solenoid coil in a tool body 14 which retracts the stud against the force of a plunge spring when the coil is energized. A chuck leg 16 extends into the coil and also extends forwardly of the tool body 14 where it is suitably connected to a chuck 18 (FIGS. 2 and 4). In this instance, a trim stud 20 (FIG. 4) has a head 22 which is held by the chuck 18 and a stem 24 which extends forwardly, with the stud backed up by a suitable adjustable stop 26 during the welding cycle. Studs can be fed into the front of the chuck by hand. They also can be transported by air through a tube from a remote supply source and into a chamber in the chuck leg 16 behind the chuck 18. The studs can then be pushed into the chuck from the chamber by a plunger and backed up by the plunger during the welding cycle. The plunger can be connected to a piston and an air cylinder located in the chuck leg to which air is supplied from a remote source. This type of loading arrangement for the stud is shown in U.S. Pat. Nos. 3,525,846 and 3,489,878, and does not constitute part of the present invention.

Figure 3:
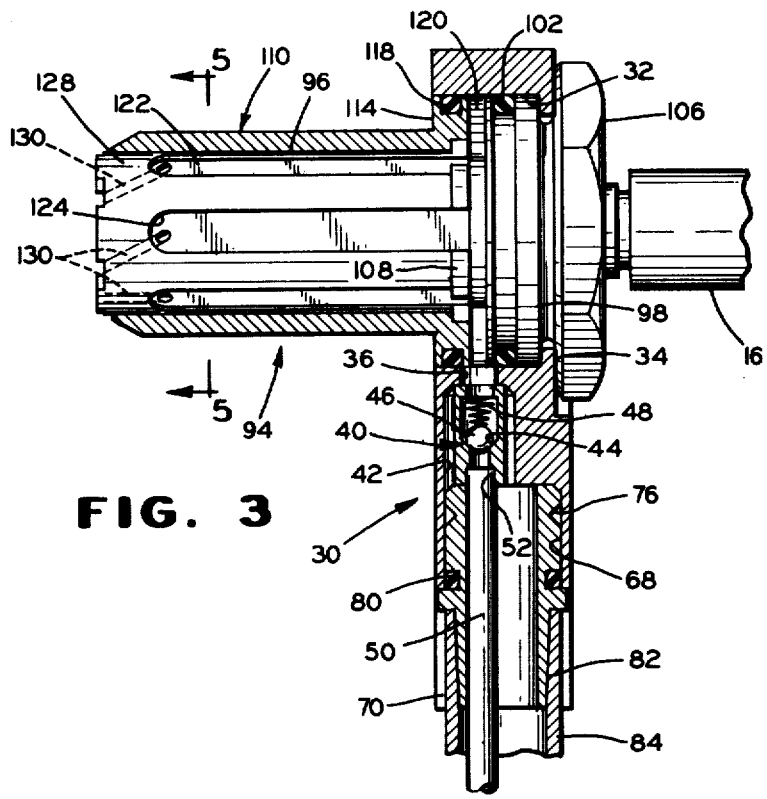
FIG. 3 is a view in vertical cross section taken along the line 3—3 of FIG. 2.

A pair of supporting legs 28 extend forwardly from the tool body 14 and support a welding foot 30. The welding foot 30 has a cylindrical opening 32 (FIG. 3)

around the chuck leg 16 with a rear, inwardly extending flange 34. A liquid supply passage 36 for anti-smut liquid is located in the welding foot and communicates radially with the opening 32 and an air supply passage 38 is also located in the foot 30 and communicates generally tangentially with the opening 32. The liquid supply passages 36 communicates with a check valve fitting 40 located in a cylindrical chamber or passage 42 with which the air passage 38 (FIG. 2) communicates. The fitting 40 has a check valve seat 44, a check valve ball 46, and a spring 48 which prevent the flow of liquid back through a supply tube 50 which is suitably affixed in a recess 52 in a lower end of the fitting 40.

Anti-smut liquid is supplied to the tube 50 from a source 54 (FIG. 1) by a suitable pump indicated schematically at 56. The pump 56 includes a piston 58 and a cylinder 60 with an inlet check valve 62 and an outlet check valve 64. Upon each stroke of the piston 58, a small quantity of the anti-smut liquid is supplied to the tube 50 with the piston 58 reciprocated at a rate of approximately 100 times per minute by a drive unit 66. The pump delivers about one-third of a drop of liquid during each back and forth stroke.

For supplying gas such as air, the chamber 42 (FIGS. 2 and 3) in the foot 30 communicates with a larger passage 68 terminating at the edge of a notch 70 in the bottom of the welding foot 30 between the supporting legs 28. A hose connector 72 has an end portion 74 extending into the passage 68 with an annular groove 76 receiving an end of a setscrew 78. The hose connector has an annular O-ring seal 80 and a lower nipple 82 extending into the notch 70. A hose 84 is received on the nipple 82 and extends to the power and control unit 12, encompassing the liquid supply tube 50 to a point near the unit 12. Gas, preferably air, is supplied from a suitable source 86 past an adjustable needle valve 88 and an on-off valve 90 through the hose 84. The needle valve 88 controls flow so that just enough air is supplied to cause the liquid to atomize and dribble from the spark shield sufficiently to coat the workpiece with a thin film around the weld area. The gas also is at low pressure, in a range of three to eight psi, and preferably about five psi. The liquid is supplied in a quantity of twenty-five to one hundred-twenty five milliliters per hour. The lower quantity is sufficient to prevent smut but a higher quantity of seventy milliliters is more effective to prevent splatter build-up in the spark shield. The gas and liquid are supplied continuously unless the welding tool 10 is not retriggered within two and one-half seconds, at which time the drive unit 66 is stopped and the valve 90 is closed by a suitable timer 92. The two and one-half seconds delay in shut-off enables extra liquid to be pumped into the spark shield so that it is supplied immediately and gives proper liquid coverage for the first weld made after the equipment has been idle.

A spark shield 94 (FIGS. 3 and 4) has a rear end portion located in the opening 32 and extends forwardly thereof. The spark shield 94 is positioned so that the stem 24 of the stud 20 is slightly beyond the end of the spark shield, as shown in FIG. 1, before the stud is pressed against the work-piece. The shield 94 includes a generally cylindrical body 96 with a rear flange 98 which abuts the flange 34 of the welding foot 30. An annular groove 100 is formed in the flange 98 and contains an O-ring 102. A threaded shank 104 extends beyond the rear face of the welding foot 30 and beyond the flange 34 where it receives a large nut 106 holding the spark shield 94 in the foot with the flange 98 abutting the flange 34.

The spark shield 94 also includes a segmented shoulder 108 which is located on the shield body 96, spaced forwardly of the flange 98. A sleeve 110 is mounted with a tight fit on the body 96 and has an annular recess 112 receiving the segmented shoulder 108. Around the recess 112 the sleeve 110 has an annular flange 114 with a groove 116 containing an O-ring 118. The sleeve flange 114 is spaced from the body flange 98, forming an annular manifold chamber 120 with the cylindrical foot opening 32, with the chamber 120 being sealed off by the O-rings 102 and 118.

A plurality of longitudinally-extending fluid passages 122 in the body 96 communicate with the chamber 120 and extend forwardly of the shoulder 108 toward the forward end of the body 96, but terminating short thereof at forward ends 124. The passages are formed by grooves in the body 96 and by the inner surface of the sleeve 110.

A plurality of rectangularly-shaped, radially-extending notches 126 are located in the forward edge of a thicker end portion 128 of the body 96. The shield is preferably made of copper or brass and the inner surface of the end portion 128 is highly polished to minimize the adherance of splatter or small weld particles thereto.

A plurality of fluid passages 130 are located in the end portion 128 of the spark shield body 96, there being one of the passages 130 for each of the longitudinally-extending passages 122. Each of the passages 130 has an inner end communicating with an end portion of one of the passages 122 and an outer end terminating at one of the radially-extending notches 126. The air and the liquid mix in the annular chamber 120 and then flow through the longitudinal passages 122 to the passages 130. With the passages terminating at the notches, rather than at the inner surface of the spark shield, the passages will not become clogged with splatter. The passages 130 are positioned to direct the low volume air and anti-smut liquid in a swirling fashion toward the workpiece around the location at which the end of the stud stem 24 is to be welded. The low volume results in the liquid being deposited at very low velocity as a thin film on the surface from the passages 130 to prevent the formation of smut on the workpiece, and to minimize the possibility of the pilot arc or the main welding arc being extinguished and no weld thereby resulting. The air is believed to be the major factor in the prevention of smut but the liquid enables a lower volume of air to be used and prevents the build-up of splatter in the spark shield.

Each of the passages 130 forms an angle of about 30° to 80°, and preferably about 60°, with the plane of the end of the spark shield 94 as shown in FIG. 3. Each of the passages 130 also forms an angle of about 80° to 100°, and preferably 90° to a radius of the spark shield which extends through the notch end of the passage, as viewed in FIG. 2. For trim studs, each of the passages has a diameter of about 0.040" to about 0.060" and preferably 0.052", with one to ten passages being employed. The outer ends of the passages 130 terminating in the notches 126 are from 0.020" to about 0.080" and preferably from about 0.045" to about 0.060" from the end of the spark shield and the surface of the workpiece. The angles, lengths, and diameters of the fluid passages 130 will vary according to the stud size, spark shield size, and air pressure and liquid volume, by way of example.

The important effect is to supply the air and liquid with a swirling motion in a non-turbulent manner around the weld area to prevent the deposition of smut without extinguishing the arcs.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In a method of welding a trim stud to a vehicle body with a surface of the vehicle body around the trim stud kept substantially free of smut, said method comprising holding a trim stud against a surface of a vehicle body, withdrawing the stud from the surface of the vehicle body, establishing a welding arc between the end of the trim stud and the surface of the vehicle body, moving the stud back toward the surface of the vehicle body, and directing streams of gas and anti-smut liquid toward the surface of the vehicle body at angles to the surface of the vehicle body around but not at the location of the weld during the entire welding cycle, to cause the streams to move in a swirling pattern around the weld location on the vehicle body.

2. The method according to claim 1 comprising mixing the anti-smut liquid in measured quantities with the gas at a substantial distance upstream from the location in which the streams are directed toward the surface of the vehicle body.

3. The method according to claim 1 characterized by directing the streams of fluid toward the vehicle body as a plurality of separate and distinct streams.

4. A method of welding a stud to a surface of a workpiece with the surface of the workpiece around the stud kept substantially free of contaminant coatings, said method comprising holding the stud against a surface of the workpiece, withdrawing the stud from the surface of the workpiece, establishing a welding arc between the stud and the surface of the workpiece, moving the stud back toward the surface of the workpiece, and directing a plurality of low velocity streams of gas and anti-smut liquid with a swirling motion toward the surface of the workpiece around but not at the location of the weld during the entire welding cycle, to cause the streams to move in a swirling pattern around the weld location to keep the area around the weld location free of smut.

5. The method according to claim 4 characterized by directing the low velocity streams at angles of 60°–80° to the surface of the workpiece.

* * * * *

UNITED STATES PATENT OFFICE
CERTIFICATE OF CORRECTION

PATENT NO. : 4,486,644
DATED : December 4, 1984
INVENTOR(S) : Thomas E. Shoup

It is certified that error appears in the above-identified patent and that said Letters Patent are hereby corrected as shown below:

Column 4, line 3, "The spark shield 94 also includes a" should be --A--.

Column 4, line 4, "which" should be deleted.

Column 4, line 5, "A" should be --The spark shield 94 also includes a--.

Column 4, line 5, "which" should be inserted after --110--.

Signed and Sealed this

Twenty-eighth Day of May 1985

[SEAL]

Attest:

DONALD J. QUIGG

Attesting Officer   Acting Commissioner of Patents and Trademarks